United States Patent [19]

McNeill

[11] Patent Number: 4,781,907

[45] Date of Patent: Nov. 1, 1988

[54] PRODUCTION OF MEMBRANE-DERIVED NITROGEN FROM COMBUSTION GASES

[76] Inventor: John M. McNeill, 14021 Marquesas Way, Marina Del Rey, Calif. 90292

[21] Appl. No.: 804,809

[22] Filed: Dec. 4, 1985

[51] Int. Cl.⁴ .................... B01D 53/22; F23N 1/02
[52] U.S. Cl. ........................ 423/351; 55/16; 55/68; 252/372
[58] Field of Search ............... 55/16; 423/351; 252/372

[56] References Cited

U.S. PATENT DOCUMENTS

| | | | |
|---|---|---|---|
| 914,279 | 3/1909 | Hurford | 423/351 |
| 1,154,172 | 9/1915 | Brownlee et al. | 252/372 |
| 2,247,625 | 7/1941 | Willenborg | 252/372 |
| 2,276,690 | 3/1942 | Germany | 423/351 |
| 2,540,151 | 2/1951 | Weller et al. | 55/16 |
| 2,772,952 | 12/1956 | Jacobs | 252/372 |
| 2,871,107 | 1/1959 | Hartman | 252/372 |
| 2,892,508 | 6/1959 | Kohman et al. | 55/16 |
| 2,966,235 | 12/1960 | Kammermeyer | 55/16 |
| 3,102,780 | 9/1963 | Bedrosian et al. | 252/372 |
| 3,145,085 | 8/1964 | Breault | 423/351 |
| 3,274,750 | 9/1966 | Robb | 55/16 |
| 3,350,844 | 11/1967 | Robb | 55/16 |
| 3,353,921 | 11/1967 | Hirt | 252/372 |
| 3,510,387 | 5/1970 | Robb | 55/16 |
| 3,725,012 | 4/1973 | Gower | 252/372 |
| 3,903,694 | 9/1975 | Aine | 55/16 |
| 3,947,217 | 3/1976 | Graat et al. | 252/372 |
| 4,264,338 | 4/1981 | Null | 55/16 |
| 4,530,703 | 7/1985 | Malon et al. | 55/16 |
| 4,545,787 | 10/1985 | Hegarty | 55/16 |
| 4,551,156 | 11/1985 | Li | 55/16 |
| 4,729,879 | 3/1988 | Black | 423/351 |

FOREIGN PATENT DOCUMENTS

| | | | |
|---|---|---|---|
| 1186245 | 4/1985 | Canada | 55/16 |
| 1330141 | 11/1961 | France | 423/351 |
| 933071 | 8/1963 | United Kingdom | 252/372 |

Primary Examiner—John Doll
Assistant Examiner—Wayne A. Langel
Attorney, Agent, or Firm—Christie, Parker & Hale

[57] ABSTRACT

High-purity nitrogen is recovered from combustion gas such as exhaust stack gases, by utilizing selective gas-permeable membranes to separate by rejection, nitrogen from the other gases present in the gas stream.

12 Claims, 2 Drawing Sheets

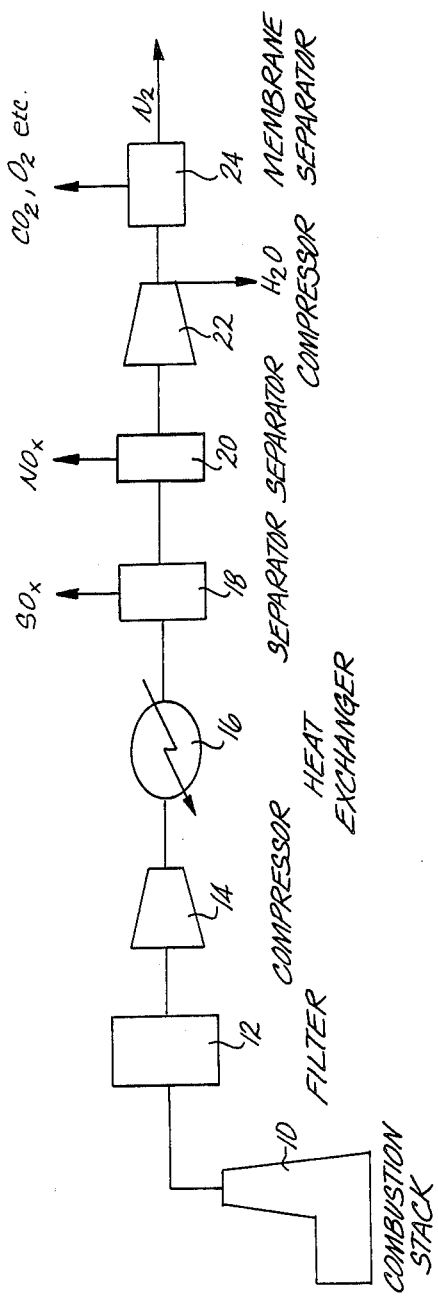

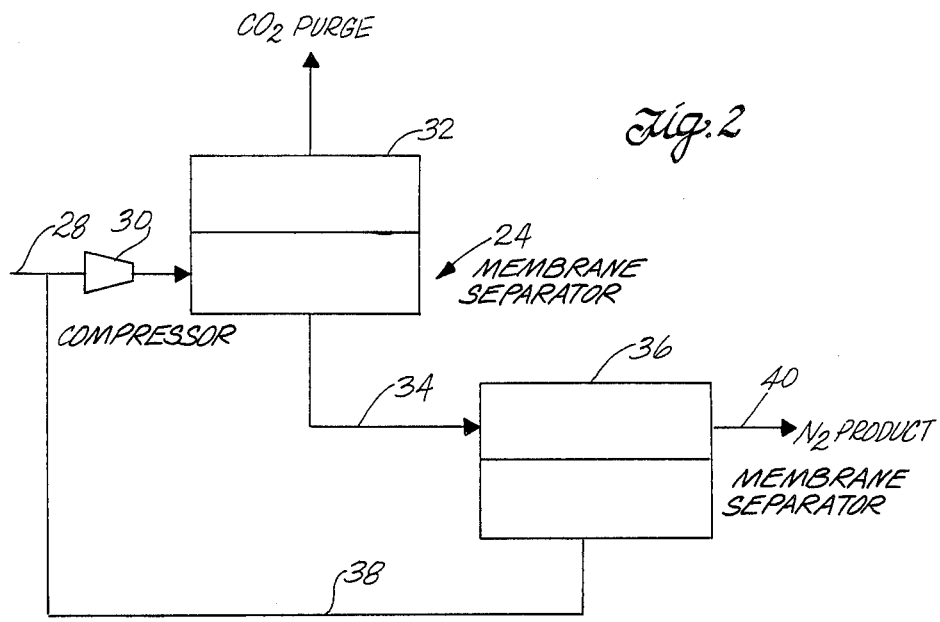

PRODUCTION OF MEMBRANE-DERIVED NITROGEN FROM COMBUSTION GASES

BACKGROUND OF THE INVENTION

This invention pertains to a process for the production of molecular nitrogen ($N_2$) from combustion gases by utilizing membranes to achieve the separation of the nitrogen from the other molecular constituents present in such combustion or stack gas streams.

Nitrogen has many commercial uses. The oil, gas, and chemical industries require large volumes of the gas. The most widely used commercially available process for the production of large volumes of nitrogen is based on the cryogenic separation of nitrogen from air. This process, which has been practiced for over 30 years, has probably reached its efficiency peak, because of high cost, other technologies have been investigated but have been limited to smaller-volume applications, where cost is not crucial.

Membranes can be used to preferentially separate a desired gaseous molecule from a mixture of other gases molecules under specified conditions, based on the respective gas permeabilities through a specific membrane. A specific membrane, or combinations of different membranes with different gas permeabilities, can be customized through the selection of the membranes used and the configuration (parallel or series) selected to achieve the desired separation. Since membrane modules have no moving parts, they are ideal for unattended operation. In addition, the physical properties of the membrane plants, such as size and weight, make possible a portable production facility. This is not feasible with cryogenic separation. In consequence, production of nitrogen by the use of membranes can offer significant advantages over other known nitrogen-production systems.

SUMMARY OF THE INVENTION

The present invention provides a process for the recovery of high-purity molecular nitrogen ($N_2$) from molecular gaseous constituents in combustion gases by utilizing selective gas-permeable membranes to achieve concentrative rejective separation of nitrogen from the other gases molecules present in the gas streams resulting from combustion of a carbonaceous material.

The process consists of at least two stages. The first stage is directed to processing of the combustion gas stream in order to condition it for feed to at least one membrane separation stage. The first stage processing may include any or all of the following gas processing operations: filtration, heat exchange, compression and removal of the oxides of nitrogen and sulfur. The extent and type of processing depends on the quality of the comubstion gas and type of membrane(s) used for nitrogen recovery. The quality of the combustion gas is primarily based on the type of fuel combusted. Sweet natural gas is preferred as it requires the minimum of processing.

The conditioned gas stream is then introduced to one or more membrane separation stages (membrane modules) where the actual separation of molecular nitrogen by rejective concentration occurs. A membrane module normally consists of a plurality of membrane elements configured into the system, which results in the desired separation of nitrogen from the balance of the stream, primarily carbon dioxide and oxygen. The nitrogen stream exits the membrane module as a residue stream. Nitrogen purities in excess of 97% by volume with an oxygen content of only 1% by volume can be realized. In essentially all instances, the bulk of the balance of the gas stream is carbon dioxide. The nitrogen is collected and piped to a consumer or producer for direct use, or liquefied and shipped for end-use.

The separation system is portable making it extremely attractive for on site production of nitrogen from combustion products or stack gases.

BRIEF DESCRIPTION OF THE DRAWINGS

FIG. 1 illustrates one overall scheme for use in the practice of the process of the instant invention.

FIG. 2 illustrates a presently preferred scheme for membrane recovery of nitrogen.

DETAILED DESCRIPTION

The present invention is directed to a process for the recovery of molecular nitrogen from combustion gases resulting from the combustion of carbonaceous fuels, including natural gas, crude oil, coal, fuel oils, liquefied petroleum gases, synthetic fuels and the like.

The combustion or stack gases will typically be saturated with water and at a temperature of from about 300° to 800° F. On a broad base, on a percent by-volume basis, combustion gases will contain on a dry basis from about 70% to about 86% nitrogen; from about 4% to about 20% carbon dioxide; from about 0.1% to about 6% oxygen; from about 0.001% to about 1.5% sulfur oxides ($SO_x$); from about 10 to about 1000 ppmv nitrogen oxides ($NO_x$); and from about 10 to about 500 ppmv carbon monoxide. Particulates will range from about 0.01 to about 0.20 pound per MMBTU.

The preferred source is sweet natural gas as used in some localities for the generation of electricity and steam. The combustion products contain on a dry basis about 86% by volume nitrogen, about 12% by volume, carbon dioxide and about 2% by volume oxygen. Oxides of nitrogen and sulfur are inconsequential. A useful but less desirable gas is from lease crude which contains about 85 to 86% by volume nitrogen, about 10% by volume carbon dioxide and about 4.5% by volume oxygen. Impurities include about 120 ppmv $NO_x$, 30 ppmv $SO_x$ and 10 ppmv CO as a worst case.

The process of recovery of nitrogen from the combustion gases comprises essentially two stages. The first stage is directed to conditioning the combustion gas in order to prepare the gas for feed to the membrane separation stage. The second or membrane separation stage provides for membrane separation of nitrogen from the other gases constituents which make up the membrane processed gas steam. The processed gaseous stream mainly comprises nitrogen, carbon dioxide and oxygen. By use of gas permeable systems, nitrogen is rejectively separated yielding a residual nitrogen enriched gas which is 95 or less to 97 or more percent by volume nitrogen.

The collecting and conditioning stage includes, but is not limited to, the steps of filtration, cooling, compression, and dehydration of the gas stream, and as required sulfur oxide ($SO_x$), and nitrogen oxide ($NO_x$) treatment and/or removal. The types of operations selected for each plant will depend on the composition of the combustion gas and cost of energy. The precise method of pretreating the combustion gases will thus vary from case to case. Sulfur oxide removal can be accomplished through a number of means, including chemical methods, such as reduction to hydrogen sulfide followed by absorption of hydrogen sulfide; molecular-sieve separation; pressure swing adsorption (PSA); and the like. Removal of the oxides of nitrogen can be accomplished through chemical, membrane, and/or catalytic means.

With reference to FIG. 1, a combustion gas from some operation is provided at stack 10 at a vacuum of from 2" to 4" $H_2O$. It is generally then drawn through filter 12 to remove any entrained particulate matter. The gas stream may then be fed to compressor 14, where its pressure is raised to from about 10" to about 30" $H_2O$, and is passed through heat-exchanger 16 (closed-loop or air-cooled), where its temperature is reduced to a level from about 70° F. to about 160° F. The need for sulfur oxide and nitrogen oxide separation stages 18 and 20 depend on combustion gas purity and the content of such oxides. Membranes or other means may be used to selectively remove the oxides of sulfur and nitrogen. The gas stream is then be fed to a further compressor 22 where its pressure is increased to a level necessary for membrane separation. A positive effect of compression is that the water content of the gas may further reduced by condensation. To enhance membrane separation, the gas may be passed through a dryer, coalescer, or the like, in order to reduce its water content to a level of less than about 50% relative humidity (R.H.) preferably below the dew point of the gas stream for purposes of membrane separation.

Many of the above steps may be eliminated by the use of sweet natural gas. About the only operations required are compression to enable filtration and provide the driving force for membrane separation with attendant separation of water in consequence of compression and of necessary dessication.

In any event the relatively dry, compressed combustion gas is then passed through one or more membranes which form membrane separation stage 24. The membranes employed allow oxygen and carbon dioxide to be selectively separated to the rejection of nitrogen as a process residue being somewhat equivalent to tray separation in distillation nitrogen purity is a function of the membrane type, area, and configuration employed. Each membrane module employed comprises a configuration of a plurality of selectively-permeable membranes in series and/or in parallel, which nitrogen permeation is at a lower rate than oxygen and carbon dioxide. Individual membrane elements may be of hollow-fiber, spiral-wound, or flat configurations. Preferably, the alpha ($\alpha$) ratio, or the ratio of the permeability rate of oxygen and/or carbon dioxide to the permeability rate of nitrogen, will range from about 2 to about 20.

Separation is preferably carried out to produce a product gas containing at least 90% by volume nitrogen and no more than about 1 to about 5% by volume oxygen. The membrane elements may be made of a number of materials, including cellulose ester; silane, siloxane, or silicone polymers; polyphenylene oxides; polyamides; polyimides; polysulfones; polycarbonates; polyacrylonitriles; polytetrafluoroethylenes; polyesters polydefins; polyvinyl alcohols; poly (4-vinyl pyridine), polyurethanes; and the like, as well as combinations thereof. It is presently preferred to utilize membranes formed of polysulfone, cellulose acetate and silicone polymers.

Table 1 lists some specific membrane combinations and their shapes as a specific example of potential membrane materials.

TABLE I

| Membrane Material(s) | Membrane Form | $PO_2^{(a)}$ | $(\alpha)$ $PO_2/PN_2$ |
|---|---|---|---|
| Polysiloxane/porous (polysulfone-poly-acrylonitrile, etc.) | Composite - HF | $9.7 \times 10^{-6(b)}$ | 5.4 |
| Polysiloxane/porous support | Composite - spiral | $5.0 \times 10^{-8}$ | 2.0 |
| Polysiloxane-polycarbonate/porous | Ultrathin - flat | $1.7 \times 10^{-8}$ | 2.2 |
| $\alpha$-Olefin | Composite - flat | $7 \times 10^{-9}$ | |
| Cellulose acetate | Asymmetric - flat | $1.9 \times 10^{-6(b)}$ | 3.2 |
| Poly(vinyltri-methoxysilane) | Asymmetric - flat | $3.9 \times 10^{-9}$ | 4.0 |
| polyvinyl alcohol | Homogeneous - HF | $8.9 \times 10^{-3}$ | — |
| cellulose acetate porous + nitro-cellulose coating | Composite - HF | $1.2 \times 10^{-5(b)}$ | 3.3 |
| Poly(ethylene terephthalate) | Homogeneous - HF | $4.5 \times 10^{-12}$ | 4.1 |
| PE, PP, $PVF_2$ porous + silicone, PPO coating | Composite - HF | $5.95 \times 10^{-5(b)}$ | — |
| Poly(ethylene-1,2-diphenoxyethane-p, p'-dicarboxylate) | Homogeneous - flat | $1.2 \times 10^{-12}$ | 3 |
| Poly(vinyldimethyl-aminobenzacetal) | Homogeneous - flat | $2.8 \times 10^{-10}$ | 6.3 |
| Poly(4-vinylpyridine) | Homogeneous - flat | $2.8 \times 10^{-9}$ | 12.2 |
| Cellulose acetate | Asymmetric - flat | $1.1 \times 10^{-8}$ | — |
| Aromatic polyesters | Homogeneous - flat | $6.8 \times 10^{-10}$ | 7.2 |
| Poly(vinyltri-methoxysilane)/polysiloxane | Asymmetric - flat | $1.1 \times 10^{-4(b)}$ | 2.4 |
| Amino-functionality-containing polyurethane | Homogeneous - flat | $9 \times 10^{-12}$ | 6.4 |
| Poly(4-methyl-1-pentene) | Ultrathin homogeneous - flat | $1.8 \times 10^{-4(b)}$ | 2.9 |

$(a) \quad \dfrac{cm^3(STP) \cdot cm}{cm^2 \cdot sec \cdot cm\ Hg}$ $(b) \quad \dfrac{cm^3(STP)}{cm^2 \cdot sec \cdot cm\ Hg}$ and wherein
HF = hollow fiber
PE = Polyethylene
PP = polypropylene
$PVF_2$ = polyvinylidene fluoride
PPO = polypropylene oxide As the preconditioned combustion gas is passed through the membrane module, a nitrogen-enriched stream will preferentially exit the membrane module normally at its entry temperature and at a pressure of from about 10 to about 20 psig lower than feed pressure. The permeate stream, consisting mainly of carbon dioxide and oxygen, will exit at entry temperature but at a pressure in the range of from about 5 psig to about 50 psig. Some applications and/or configurations will favor the use of high flux membranes which sacrifice separation and others a low flux, high separation membrane modules. Two- or multi-step membrane systems using a high flux course cut membrane followed by a fine cut, low flux membrane can be effectively used.

While nowise limiting, the following Examples are illustrative of the instant invention.

EXAMPLE 1

With reference to FIG. 2, there is provided to a nitrogen-separation membrane module system, a gas stream at a pressure of 15 to 30 psig, at a flow rate of 1,000 standard cubic feet per minute, products of combustion containing on a dry basis, 12% by volume $CO_2$, 86% by volume $N_2$, and 2% by volume $O_2$. The gas stream is fed by line 28 to compressor 30 of membrane separation system 24, where it is compressed to a pressure of 103 psia, and fed to membrane module 32 containing silicone polymer membrane elements manufactured and sold by Universal Oil Products as a "SPIRAGAS" membrane having the theoretical alpha of between 2 and 10, at a flow rate of 1,330 standard cubic feet per minute. In module 32, the gas is separated by an 8-element membrane system having an effective separation area of 1060 square feet into a $CO_2$-rich purge gas emitted to the atmosphere at a pressure of 14.7 psia at the rate of 370 standard cubic feet per minute, and having a composition of 68% by volume $N_2$, 29% by volume $CO_2$, and 3% by volume $O_2$. The residue, enriched in nitrogen to a level such that it contains 94% by volume $N_2$, 4.5% by volume $CO_2$, and 1.5% by volume $O_2$, is fed at a pressure of 102 psia at a flow rate of 957 standard cubic feet per minute by line 34 to module 36, utilizing the same membrane consisting of 11 elements with 1470 square feet of membrane area for separation. In module 36, there is passed through the membrane a gas stream of the same composition as that of the feed, and returned by line 38 at the rate of 337 cubic feet per minute back to line 28 for recycle to membrane separator 32. The rejected residue, enriched to a $N_2$ concentration of 97% by volume, a $CO_2$ concentration of less than 2% by volume and an $O_2$ concentration of about 1% by volume, is delivered by line 40 as product nitrogen, at a pressure 101 psia and at a flow rate of 627 standard cubic feet per minute. The compressor employed is a two-stage compressor operated at 300 brake horsepower.

EXAMPLE 2

With a feed of the same composition of Example 1, there is utilized a polysulfone membrane manufactured and sold by Monsanto Corp. under the name PRISM, Total effective separation area is about 45,000 square feet. The primary vent contains on a per-volume basis, 71.8% $N_2$, 24.8% $CO_2$, and 3.4% $O_2$, and the product stream contains 96.1% by volume $N_2$, 2.9% by volume $CO_2$, and 1% by volume $O_2$.

EXAMPLE 3

When as in Example 1 there is used a cellulose acetate membrane known in the art as GASEP provided by Envirogenics, Inc., and having a total area of about 100,000 square feet the vent, is exhausted at a rate of 405 standard cubic feet per minute, contains 71.2% by volume $N_2$, 25.3% by volume $CO_2$, and 3.5% by volume $O_2$, while the product nitrogen gas stream, delivered at a rate of 595 standard cubic feet per minute, contains 96.1% by volume $N_2$, 2.9% by volume $CO_2$, and 1% by volume $O_2$.

EXAMPLE 4

Using the separation membrane system of Example 2 and at the same feed rate, but for a feed gas stream containing 82.4% by volume $N_2$, 13.3% by volume $CO_2$, and 4.3% by volume $O_2$, the vent gas stream is emitted at a rate of 659 standard cubic feet per minute and contains 74.1% by volume $N_2$, 19.9% by volume $CO_2$, and 6% by volume $O_2$, and yielded a product gas stream at the rate of 341 standard cubic feet per minute at a per-volume concentration of nitrogen at 98.4% $CO_2$ at 0.6% and oxygen at 1%.

EXAMPLE 5

The procedure of Example 4 is repeated except there is used the cellulose acetate membrane of Example 3. The vent gas stream produced at the rate of 647 standard cubic feet per minute and contains 73.7% by volume nitrogen, 20.2% by volume carbon dioxide, and 6.1% by volume oxygen. The product gas stream is delivered at a rate of 353 standard cubic feet per minute and contains 98.3% by volume nitrogen, 0.7% by volume carbon dioxide, and 1% by volume $O_2$.

What is claimed is:

1. A process for the production of nitrogen, which comprises:
   (a) combusting a carbonaceous fuel to form a combustion gas comprising nitrogen, carbon dioxide, and oxygen;
   (b) treating the combustion gas to remove to the extent present particulates, the oxides of sulfur, and the oxides of nitrogen and compressing the treated gas stream with or without water condensation in one or more stages of compression to a pressure sufficient to enable membrane separation of molecular nitrogen from carbon dioxide and oxygen; and
   (c) contacting the compressed, treated gas stream at a temperature of from about 70° to about 160° F. with at least one membrane preferentially selective to reject nitrogen to yield a permeate comprising carbon dioxide and oxygen and a residue concentrated in nitrogen, said membrane having an oxygen and/or carbon dioxide-to-nitrogen ratio of permeability of from about 2.0 to about 20.0 and there is formed a nitrogen enriched gas stream containing at least 90% by volume nitrogen and no more than about 1 to about 5% by volume oxygen.

2. A process as claimed in claim 1 in which the membrane is made of a material selected from the group of cellulose acetate resins, silicone polymers, and polysulfones.

3. A process as claimed in claim 1 in which the combustion gas stream contains particulate matter, and the particulate matter is removed by filtration.

4. A process as claimed in claim 1 in which the combustion gas stream is passed through membranes preferentially permeable to oxides of sulfur and oxides of nitrogen, and the resultant gas, substantially free of oxides of sulfur and nitrogen, is collected for feed to the nitrogen-separation membrane.

5. A process as claimed in claim 1 in which the compressed, treated gas stream is introduced to the nitrogen-separation membrane at a pressure of from about 100 psig to about 800 psig.

6. A process as claimed in claim 5 in which the compressed, treated gas stream is introduced to the nitrogen-separation membrane at a temperature of from about 70° F. to about 160° F.

7. A process as claimed in claim 6 in which the compressed, treated gas stream is introduced to the nitrogen-separation membrane with a water content of less than 50% relative humidity.

8. A process as claimed in claim 1 in which the carbonaceous fuel is sweet natural gas, the combustion gas contains, on a dry basis, about 86% by volume nitrogen, about 12% by volume carbon dioxide and about 2% by volume oxygen, and in which there is formed a residue product gas containing about 97% by volume or more of nitrogen, about 2% by volume or less of carbon dioxide and about 1% by volume oxygen.

9. A membrane-permeation process for producing nitrogen-enriched gas which comprises:
  (a) combusting a carbonaceous fuel to form a combustion gas comprising, on a dry basis, from about 70 to about 86% by volume nitrogen, from about 4 to about 20% by volume carbon dioxide and from about 0.1 to about 6% by volume oxygen;
  (b) processing the combustion gas stream in a first stage to remove to the extent present;
    (i) particulate matter by filtration; and
    (ii) gas oxides of nitrogen and oxides of sulfur;
  (c) compressing the treated combustion as to a pressure of about 100 to about 800 psig;
  (d) introducing the compressed combustion gas stream to a membrane separation zone comprising at least one membrane having an oxygen and/or carbon dioxide-to-nitrogen ratio of permeability of from about 2.0 to about nitrogen ratio of permeability of from about 2.0 to about 20.0 which rejects nitrogen gas to form a nitrogen-enriched gas stream to the preferential passage of oxygen and at a temperature of from about 70° to about 160° F. and above the dew point of water in the compressed combustion gas stream, said nitrogen enriched gas stream containing at least 90% by volume nitrogen and no more than about 1 to about 5% by volume oxygen; and
  (e) collecting the nitrogen-enriched gas stream as a residue of membrane separation.

10. A process as claimed in claim 9 in which the membrane is made of a material selected from the group of cellulose acetate, silicone polymers, and polysulfones.

11. A process as claimed in claim 9 in which the carbonaceous fuel is sweet natural gas, the combustion gas contains on a dry basis about 86% by volume nitrogen, about 12% by volume carbon dioxide and about 2% by volume oxygen, and in which there is formed a residue product gas containing about 97% by volume or more of nitrogen, about 2% by volume or less of carbon dioxide and about 1% by volume oxygen.

12. A process as claimed in claim 10 in which the carbonaceous fuel is sweet natural gas, the combustion gas contains on a dry basis about 86% by volume nitrogen, about 12% by volume carbon dioxide and about 2% by volume oxygen, and in which there is formed a residue product gas containing about 97% by volume or more of nitrogen, about 2% by volume or less of carbon dioxide and about 1% by volume oxygen.

* * * * *